United States Patent
Yamaya et al.

(10) Patent No.: US 10,255,487 B2
(45) Date of Patent: Apr. 9, 2019

(54) EMOTION ESTIMATION APPARATUS USING FACIAL IMAGES OF TARGET INDIVIDUAL, EMOTION ESTIMATION METHOD, AND NON-TRANSITORY COMPUTER READABLE MEDIUM

(71) Applicant: CASIO COMPUTER CO., LTD., Shibuya-ku, Tokyo (JP)

(72) Inventors: Takashi Yamaya, Fussa (JP); Kouichi Nakagome, Tokorozawa (JP); Katsuhiko Satoh, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 7 days.

(21) Appl. No.: 15/276,376

(22) Filed: Sep. 26, 2016

(65) Prior Publication Data
US 2017/0185827 A1   Jun. 29, 2017

(30) Foreign Application Priority Data

Dec. 24, 2015  (JP) ................. 2015-250995
Apr. 1, 2016   (JP) ................. 2016-074175

(51) Int. Cl.
G06K 9/00     (2006.01)
G10L 15/25    (2013.01)
G10L 25/63    (2013.01)

(52) U.S. Cl.
CPC .......... G06K 9/00315 (2013.01); G10L 15/25 (2013.01); G10L 25/63 (2013.01)

(58) Field of Classification Search
CPC ...... G06K 9/00315; G10L 25/63; G10L 15/25
See application file for complete search history.

(56) References Cited

U.S. PATENT DOCUMENTS

| | | | | |
|---|---|---|---|---|
| 5,983,186 A | * | 11/1999 | Miyazawa | G10L 15/26 704/233 |
| 6,697,504 B2 | * | 2/2004 | Tsai | G06K 9/00288 375/240.19 |
| 7,023,454 B1 | * | 4/2006 | Knight | G06T 3/0093 345/473 |
| 2004/0001616 A1 | * | 1/2004 | Gutta | G06Q 30/02 382/118 |
| 2005/0289582 A1 | * | 12/2005 | Tavares | G06K 9/00221 725/10 |
| 2006/0069559 A1 | * | 3/2006 | Ariyoshi | G10L 13/033 704/246 |
| 2007/0033050 A1 | * | 2/2007 | Asano | G06F 17/30026 704/270 |
| 2008/0037837 A1 | * | 2/2008 | Noguchi | G06K 9/00335 382/118 |
| 2008/0201144 A1 | * | 8/2008 | Song | G06K 9/00281 704/236 |

(Continued)

FOREIGN PATENT DOCUMENTS

JP      2014178970 A    9/2014

*Primary Examiner* — Ming Y Hon
(74) *Attorney, Agent, or Firm* — Holtz, Holtz & Volek PC (57) ABSTRACT

A speech determiner determines whether or not a target individual is speaking when facial images of the target individual are captured. An emotion estimator estimates the emotion of the target individual using the facial images of the target individual, on the basis of the determination results of the speech determiner.

12 Claims, 7 Drawing Sheets

(56) References Cited

U.S. PATENT DOCUMENTS

| | | | | |
|---|---|---|---|---|
| 2008/0260212 | A1* | 10/2008 | Moskal | A61B 5/1079 |
| | | | | 382/118 |
| 2009/0285456 | A1* | 11/2009 | Moon | G06K 9/00335 |
| | | | | 382/118 |
| 2011/0305384 | A1* | 12/2011 | Aoyama | G06K 9/00281 |
| | | | | 382/159 |
| 2012/0120219 | A1* | 5/2012 | Wang | H04N 21/4223 |
| | | | | 348/77 |
| 2014/0002573 | A1* | 1/2014 | Kim | H04N 7/147 |
| | | | | 348/14.01 |
| 2014/0267933 | A1* | 9/2014 | Young | H04N 21/42203 |
| | | | | 348/734 |
| 2014/0321720 | A1* | 10/2014 | Bank | G06K 9/00308 |
| | | | | 382/118 |
| 2014/0328547 | A1* | 11/2014 | Whitehill | G06K 9/00 |
| | | | | 382/248 |
| 2015/0199965 | A1* | 7/2015 | Leak | G10L 15/22 |
| | | | | 704/249 |
| 2015/0340047 | A1* | 11/2015 | Beerends | G10L 21/02 |
| | | | | 704/201 |
| 2017/0311863 | A1* | 11/2017 | Matsunaga | A61B 5/165 |

* cited by examiner

NORMALIZED FACIAL
IMAGE FOR LEARNING

CHARACTERISTIC
VALUE A1

EMOTION LABEL
"ANGRY"

FIG.4B

NORMALIZED FACIAL
IMAGE FOR LEARNING

CHARACTERISTIC
VALUE D1

EMOTION LABEL
"ANGRY"

FIG.5

| IMAGE NORMALIZATION PARAMETERS | PARTITION PARAMETERS | HISTOGRAM NORMALIZATION PARAMETERS | SVM PARAMETERS |
|---|---|---|---|

EMOTION ESTIMATION APPARATUS USING FACIAL IMAGES OF TARGET INDIVIDUAL, EMOTION ESTIMATION METHOD, AND NON-TRANSITORY COMPUTER READABLE MEDIUM

CROSS-REFERENCE TO RELATED APPLICATION

This application claims the benefit of Japanese Patent Application No. 2015-250995, filed on Dec. 24, 2015, and Japanese Patent Application No. 2016-074175, filed on Apr. 1, 2016, the entire disclosure of which is incorporated by reference herein.

FIELD

This application relates generally to an emotion estimation apparatus that uses facial images of a target individual, an emotion estimation method, and a non-transitory computer readable medium.

BACKGROUND

Technology for estimating the emotions of a target individual has been known from before. For example, Unexamined Japanese Patent Application Kokai Publication No. 2014-178970 discloses an apparatus for estimating the emotions of a target individual using facial images.

SUMMARY

An emotion estimation apparatus comprising a processor, wherein the processor executes:
  a speech determination process for determining whether or not a target individual is speaking when facial images of the target individual are captured; and
  an emotion estimation process for estimating emotions of the target individual, by executing an emotion estimation process using the facial images of the target individual on the basis of the determination results of the speech determination process.

BRIEF DESCRIPTION OF THE DRAWINGS

A more complete understanding of this application can be obtained when the following detailed description is considered in conjunction with the following drawings, in which.

DETAILED DESCRIPTION

Below, functions and operation of an emotion estimation apparatus according to an exemplary embodiment of the present disclosure are described in detail with reference to the drawings. In the drawings, same or similar parts are labeled with the same reference symbols.

An emotion estimation apparatus estimates emotions of a target individual using facial images of the target individual.

Figure 1:
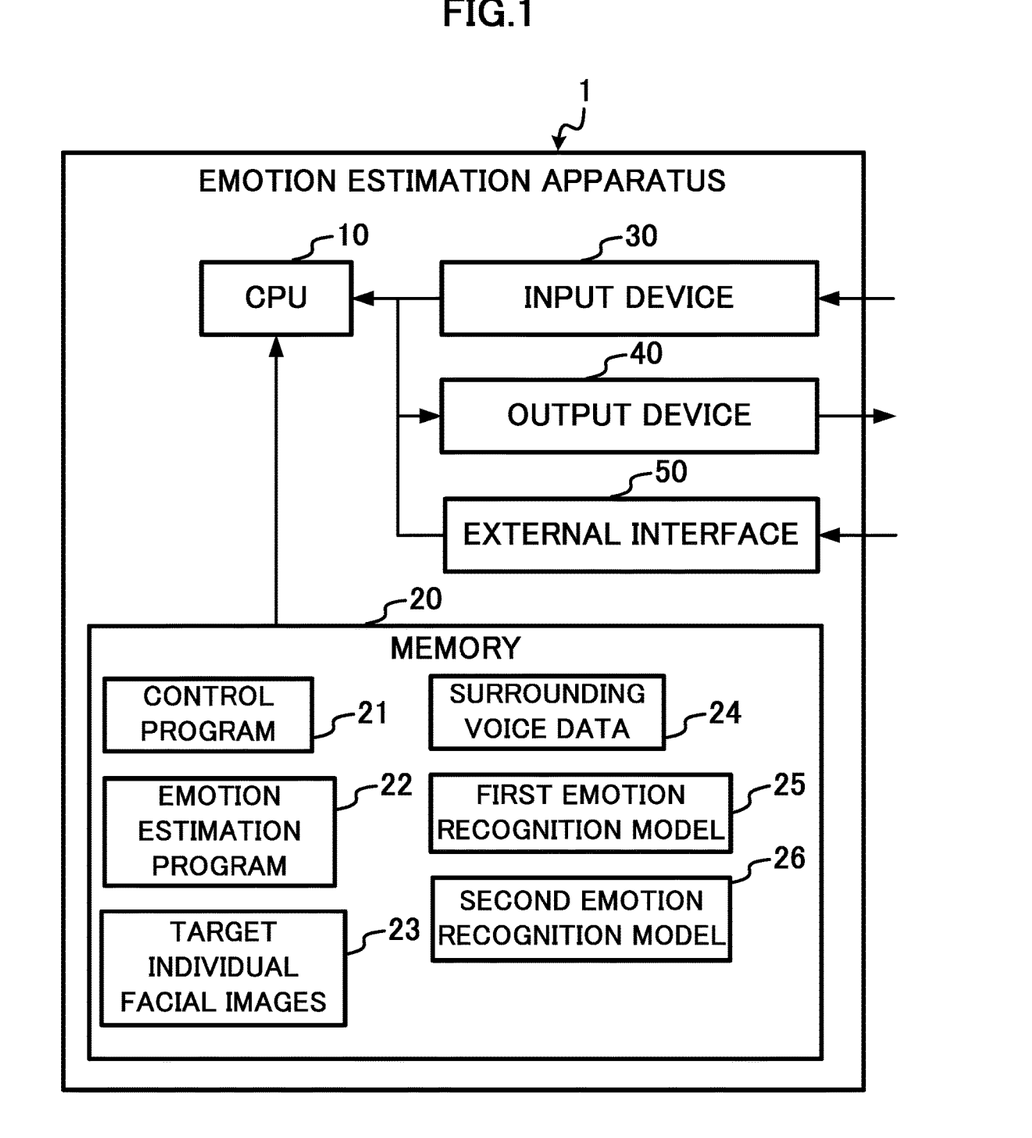
FIG. 1 is a block diagram showing one example of a physical configuration of an emotion estimation apparatus according to an exemplary embodiment of the present disclosure.

As shown in FIG. 1, an emotion estimation apparatus 1 includes a central processing unit (hereafter abbreviated "CPU") 10, a memory 20, an input device 30, an output device 40 and an external interface 50.

The CPU 10 executes various programs stored in the memory 20. Specifically, the CPU 10 controls the emotion estimation apparatus 1 as a whole by executing a control program 21 stored in the memory 20. In addition, the CPU 10 realizes functions of a below-described speech determiner 100 and emotion estimator 110 by executing an emotion estimation program 22 stored in the memory 20.

The memory 20 includes random access memory (RAM) and functions as work memory for the CPU 10. In addition, the memory 20 includes non-volatile memory such as read-only memory (ROM), a hard disk drive and/or the like, and stores various types of data and various types of programs. Specifically, in this exemplary embodiment the memory 20 stores the control program 21, the emotion estimation program 22, target individual facial images 23, surrounding voice data 24, a first emotion recognition model 25 and a second emotion recognition model 26.

The control program 21 is a program for controlling the entirety of the emotion estimation apparatus 1. The emotion estimation program 22 is a program for realizing functions of the below-described speech determiner 100 and emotion estimator 110. The target individual facial images 23 are images expressing the face of a target individual. The emotion estimation apparatus 1 estimates emotions of the target individual using the target individual facial images 23. The surrounding voice data 24 is voice data expressing voices surrounding the target individual when the target individual facial images 23 are captured. In the memory device 20, the target individual facial images 23 and the surrounding voice data 24 are stored associated with each other. When the target individual facial images 23 are still image data, voice data several seconds before and after the still image data is captured, for example, is acquired for the surrounding voice data 24 and the still image data and the voice data are associated with each other. When the target individual facial images 23 are video data, the voice data may be acquired simultaneously with acquisition of the video data, and the target individual facial images 23 and the surrounding voice data 24 may be included in a single item of file data such as movie file data, for example. Details of the first emotion recognition model 25 and the second emotion recognition model 26 are described below.

The emotion estimation apparatus 1 acquires in advance the target individual facial images 23 captured by an imaging apparatus (not shown), and stores the images in the memory 20. The emotion estimation apparatus 1 acquires in advance the surrounding voice data 24 acquired by an external sound recording apparatus (not shown), and stores the data in the memory 20. The emotion estimation apparatus 1 acquires in advance the first emotion recognition model 25 and the second emotion recognition model 26 generated by an external emotion recognition model generation apparatus (not shown), and stores the models in the memory 20. The emotion recognition model generation apparatus is, for example, a computer set up at a plant that manufactures the emotion estimation apparatus 1. Details of generation of the first emotion recognition model 25 and the second emotion recognition model 26 by the emotion recognition model generation apparatus are described below.

The input device 30 receives input in accordance with user manipulation. The input device 30 supplies input received to the CPU 10.

The output device 40 outputs various types of data in formats recognizable by the user. Specifically, the output device 40 includes a display (not shown), and displays on this display emotion images that are images expressing emotions of the target individual estimated by the emotion estimation apparatus 1. A text message expressing the target individual's emotions, and/or the like, can be cited as specific examples of emotion images.

The external interface 50 exchanges various types of data with external apparatuses (not shown). Specifically, the emotion estimation apparatus 1 acquires the target individual facial images 23, the surrounding voice data 24, the first emotion recognition model 25 and the second emotion recognition model 26, via the external interface 50. In addition, the emotion estimation apparatus 1 sends emotion information that is information expressing estimated emotions of the target individual to an external information processing apparatus (not shown).

Figure 2:
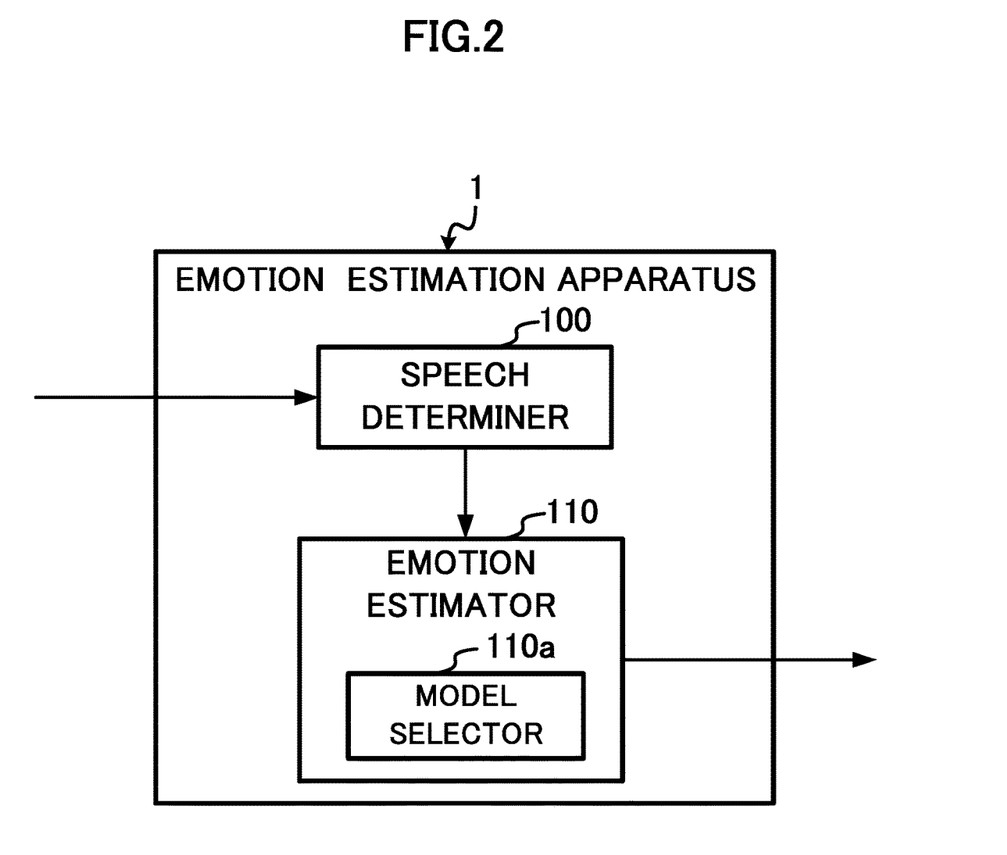
FIG. 2 is a block diagram showing one example of a functional configuration of the emotion estimation apparatus according to the exemplary embodiment of the present disclosure.

The emotion estimation apparatus 1 having the above-described physical configuration functionally includes the speech determiner 100 and the emotion estimator 110, as shown in FIG. 2.

The speech determiner 100 determines whether or not the target individual is speaking when the target individual facial images 23 are captured.

Specifically, when the target individual facial images 23 are still image data, the speech determiner 100 sets the voice data associated with the still image data as the surrounding voice data 24, and when the target individual facial images 23 are, for example, video data like movie file data, the speech determiner 100 sets the voice data in the movie file data as the surrounding voice data 24. Furthermore, if the sound volume of the surrounding voice data 24 is less than a first threshold value, the speech determiner 100 determines that the target individual is not speaking. If the sound volume of the surrounding voice data 24 is at least the first threshold value, the speech determiner 100 determines that the target individual is speaking. The first threshold value may be set in advance through an arbitrary method such as experimentation and/or the like.

The emotion estimator 110 estimates the emotions of the target individual using the target individual facial images 23 based on determination results of the speech determiner 100.

Specifically, the emotion estimator 110 includes a model selector 110a for selecting an emotion discrimination model on the basis of determination results from the speech determiner 100, and executes an emotion estimation process using the emotion recognition model selected by the model selector 110a. The model selector 110a selects the first emotion recognition model 25 when the speech determiner 100 has determined that the target individual is not speaking. On the other hand, the model selector 110a selects the second emotion recognition model 26 when the speech determiner 100 has determined that the target individual is speaking.

That is to say, when the speech determiner 100 has determined that the target individual is not speaking, the emotion estimator 110 executes the emotion estimation process using the first emotion recognition model 25. On the other hand, when the speech determiner 100 has determined that the target individual is speaking, the emotion estimator 110 executes the emotion estimation process using the second emotion recognition model 26. When the target individual facial images 23 are video data such as movie file data, for example, there are cases in which time segments where the target individual is not speaking and time segments where the target individual is speaking are intermixed during the recording time of the video data, but in such cases, the emotion estimator 100 determines that the target individual is not speaking in places where the target individual is not speaking, and determines that the target individual is speaking in places where the target individual is speaking. Furthermore, the emotion estimator 110 executes the emotion estimation process by appropriately switching the first emotion recognition model 25 and the second emotion recognition model 26 on the basis of the determination results of the speech determiner 100, during the video data recording time.

The first emotion recognition model 25 and the second emotion recognition model 26 are recognition models for estimating the emotions of the target individual using the target individual's facial images. The first emotion recognition model 25 is an emotion recognition model suitable for accomplishing emotion estimation when the target individual is not speaking. The second emotion recognition model 26 is an emotion recognition model suitable for accomplishing emotion estimation when the target individual is speaking. More specifically, the first emotion recognition model 25 estimates the target individual's emotions using images to include the mouth area of the target individual, of the facial images of the target individual. The second emotion recognition model 26 estimates the target individual's emotions using images not to include the mouth area of the target individual, of the facial images of the target individual.

The first emotion recognition model 25 and the second emotion recognition model 26 are generated by an external emotion recognition model generation apparatus (not shown), and are then acquired by the emotion estimation apparatus 1 and stored in the memory 20. The first emotion recognition model 25 is generated using images to include the mouth area of the target individual in each of facial images for learning, out of a plurality of facial images for learning. The second emotion recognition model 26 is generated using images not to include the mouth area of the target individual in each of the facial images for learning, out of a plurality of facial images for learning.

[Exemplary Embodiment of Emotion Recognition Model Generation Process]

Below, the action by which the emotion recognition model generation apparatus generates the first emotion recognition model 25 and the second emotion recognition model 26 is described with reference to FIGS. 3-5. The emotion recognition model generation apparatus generates the first emotion recognition model 25 and the second emotion recognition model 26 by executing an emotion recognition model generation process shown in the flowchart in FIG. 3.

Figure 3:
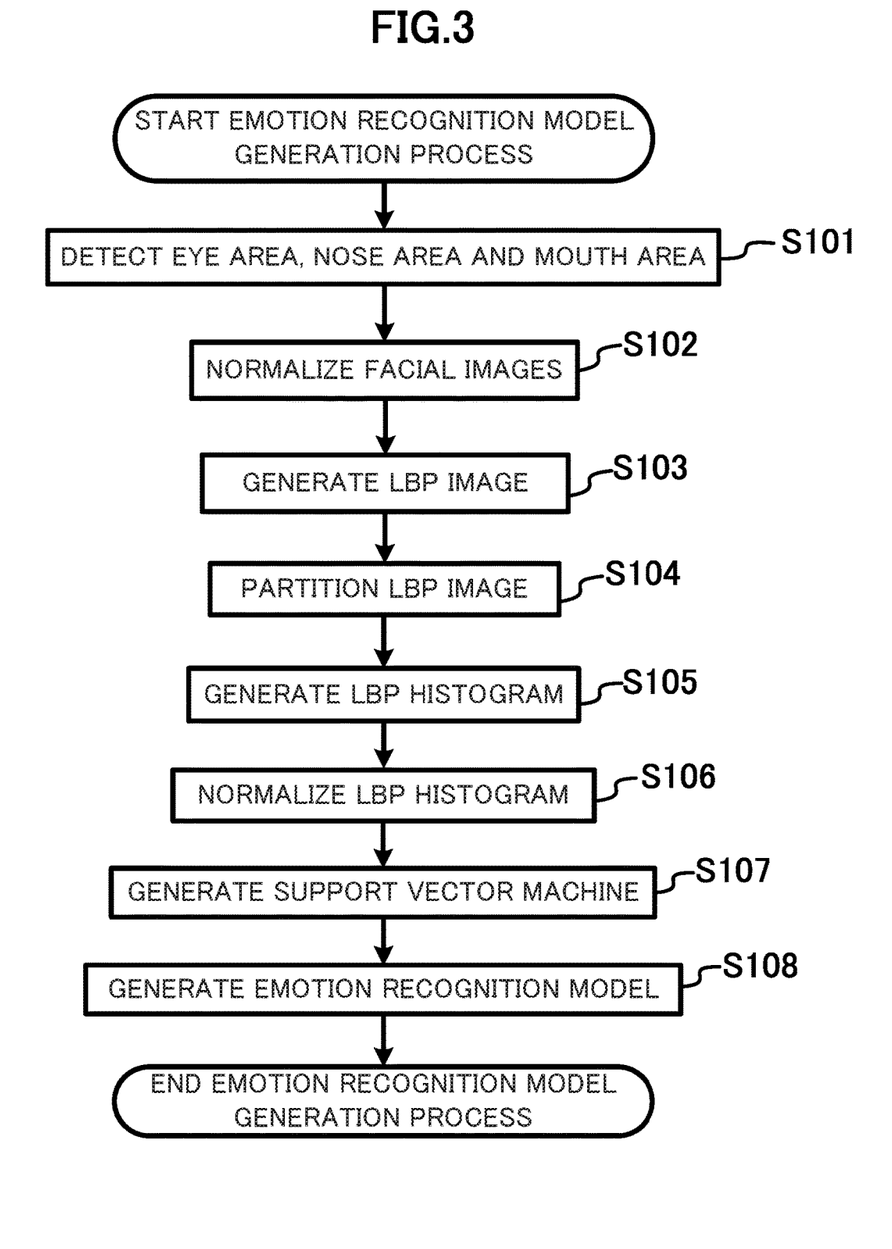
FIG. 3 is a flowchart for explaining an emotion recognition model generation process executed by an emotion recognition model generation apparatus according to the exemplary embodiment of the present disclosure.

First, the action by which the emotion recognition model generation apparatus generates the first emotion recognition model 25 by executing the emotion recognition model generation process shown in the flowchart of FIG. 3 is described.

The emotion recognition model generation apparatus acquires in advance a plurality of facial images captured by an external imaging apparatus, and stores these images in memory. Emotion labels expressing the emotion of the target individual in each of the facial images are appended to these facial images in advance.

The emotion recognition model generation apparatus specifies a portion of the plurality of facial images stored in memory as facial images for learning, and specifies the remaining facial images as facial images for evaluation.

In this state, when a user commands generation of the first emotion recognition model 25 via an input device (not shown), the emotion recognition model generation apparatus starts the emotion recognition model generation process shown in FIG. 3.

First, the emotion recognition model generation apparatus detects an eye area, which is an image area showing the eyes of the target individual, in each of the facial images for learning; a nose area, which is an image area showing the nose of the target individual, in each of the facial images for learning; and a mouth area, which is an image area showing the mouth of the target individual, in each of the facial images for learning (step S101). Technology for detecting the eye area, nose area and mouth area from the facial images is commonly known, so detailed description of such is omitted here.

Next, the emotion recognition model generation apparatus normalizes each of the facial images for learning, on the basis of the positions of the eye area, nose area and mouth area detected in step S101 (step S102). The emotion recognition model generation apparatus stores in memory image normalization parameters, which are parameters used in normalizing the facial images for learning in step S102.

Figure 4A:
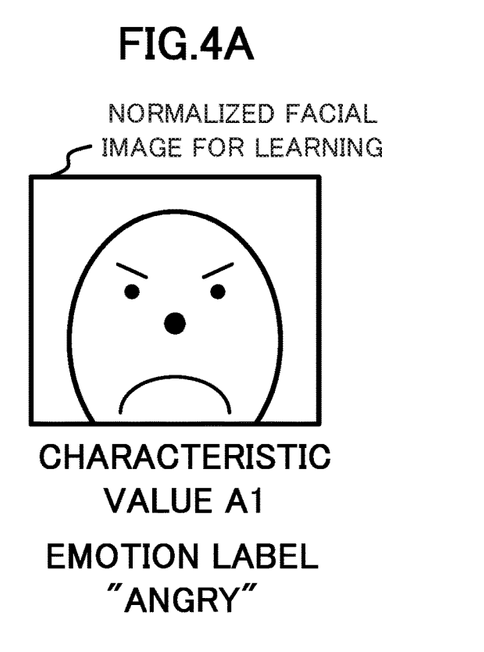
FIG. 4A is a drawing for explaining an emotion recognition model generation process for generating a first emotion recognition model.

Specifically, when the emotion recognition model generation apparatus generates the first emotion recognition model 25, by normalizing each of the facial images for learning in step S102 on the basis of the positions of the eye area and the positions of the mouth area detected in step S101, each of the facial images for learning is normalized so as to include the mouth area, as shown in FIG. 4A. The emotion recognition model generation apparatus stores in memory the image normalization parameters used in this.

For example, when the sizes of the facial images differ, the length and width of wrinkles differ in the face of the same person laughing. Consequently, there are concerns that this could cause errors in emotion recognition during speaking. In order to reduce such erroneous recognition, normalization of the facial images is accomplished.

The emotion recognition model generation apparatus calculates a local binary pattern (hereafter abbreviated as "LBP") of all pixels included in the facial images for learning, for each of the facial images for learning normalized in step S102, and through this generates an LBP image (step S103).

The emotion recognition model generation apparatus partitions each of the LBP images generated in step S103 into a plurality of blocks (step S104). The emotion recognition model generation apparatus stores in memory partition parameters that are parameters used when partitioning the LBP images into a plurality of blocks in step S104.

For example, for the eye area, the area may be partitioned into the still finer parts of the inner corner of the eye, the pupil and the outer corner of the eye, and the normalized facial images may be partitioned so as to be covered in tile shape with small rectangular areas. Furthermore, a characteristic value (LBP) is extracted for each of the finely partitioned areas.

After generating an LBP histogram for each block partitioned in step S104, the emotion recognition model generation apparatus links the LBP histograms of all of the blocks, and through this generates an LBP histogram for each of the facial images for learning normalized in step S102 (step S105). At this time, if the number of pixels in the partitioned areas differ in each of the facial images, normalization of the histograms is necessary so that the total frequency of each area is 1.

The purpose of creating histograms is to facilitate comprehensive comparison of the orientation and/or the like of wrinkles at the outer corners of the eyes when angry or when smiling, through making graphics of the distribution of characteristic values. The emotion recognition model generation apparatus creates an LBP histogram for each of the facial images for learning to which emotion labels were appended in advance.

The emotion recognition model generation apparatus normalizes all of the LBP histograms with two-dimensional units using parameters acquired on the basis of the LBP histograms of all of the facial images for learning (step S106). The emotion recognition model generation apparatus stores in memory the histogram normalization parameters that are parameters used when normalizing all of the LBP histograms with dimensional units.

Dimensional normalization is accomplished so that the spread of each of the dimensions of the LBP histograms does not differ for each dimension. This helps reduce the problem of the recognition performance decreasing when the distribution of the dimension with a large contribution to emotion identification is narrow and the distribution of the dimension that does not contribute to emotion identification is wide. Normalization methods include those based on the maximum value and minimum value, and those based on the average standard deviation, and/or the like.

The emotion recognition model generation apparatus accomplishes mechanical learning using as teaching data the LBP histograms (characteristic values) of all of the facial images for learning normalized with dimensional units in step S106, as shown in FIG. 4A, and the emotion labels appended in advance to each of the facial images for learning, and generates a support vector machine (step S107). The emotion recognition model generation apparatus stores in memory SVM parameters that are parameters defining the generated support vector machine. That is to say, the emotion recognition model generation apparatus takes as teaching data the facial images for learning to which emotion labels were appended in advance, and generates a support vector machine that identifies an emotional state when the speaker is speaking, that is to say, a human emotion. In this exemplary embodiment, the description was for a case in which the normalized LBP histograms were used as characteristic values, but this is but one example. The first emotion recognition model 25 and the second emotion recognition model 26 can be generated through mechanical learning of arbitrary characteristic values.

Figure 5:
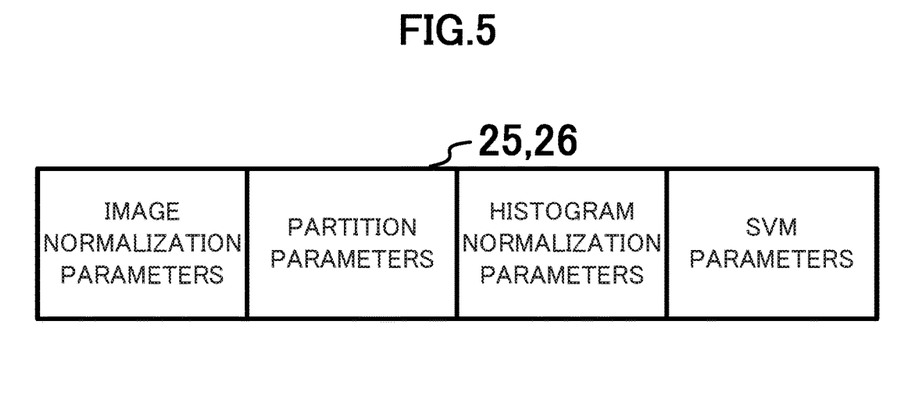
FIG. 5 is a block diagram showing an exemplary construction of an emotion recognition model according to the exemplary embodiment of the present disclosure.

The emotion recognition model generation apparatus generates the first emotion recognition model 25 having the structure shown in FIG. 5 (step S108) by mutually associating together information showing the image normalization parameters used in step S102, information showing the image partition parameters used in step S104, information showing the histogram normalization parameters used in step S106, and information showing the SVM parameters acquired in step S107, and concludes the emotion recognition model generation process.

The emotion recognition model generation apparatus may evaluate the quality of the emotion recognition model generated in step S108 using the facial images for evaluation. Specifically, the emotion recognition model generation apparatus may estimate the emotion of the targeted individual expressed by the facial images for evaluation using the generated emotion recognition model, and evaluate the quality of the emotion recognition model on the basis of whether or not the estimated result and the emotion labels appended in advance to the facial images for evaluation match. When the result of the evaluation is that a determination is made that the quality of the generated emotion recognition model does not satisfy a prescribed standard, tuning may be done that modifies each of the parameters in the emotion recognition model or relearning may be done that accomplishes mechanical learning again and then redefines each of the parameters.

As described above, the emotion recognition model generation apparatus generates the first emotion recognition model 25 using facial images for learning normalized so as to contain the mouth areas in step S102. That is to say, the emotion recognition model generation apparatus generates the first emotion recognition model 25 using images to include the target individual's mouth area in each of the facial images for learning, out of the plurality of facial images for learning.

Next, the actions of the emotion recognition model generation apparatus in generating the second emotion recognition model 26 through executing the emotion recognition model generation process shown in the flowchart of FIG. 3 is described.

The emotion recognition model generation apparatus generates the second emotion recognition model 26 by executing roughly the same process as the process in steps S101~S108 in generating the above-described first emotion recognition model 25. However, the process of step S102 differs partially.

Figure 4B:
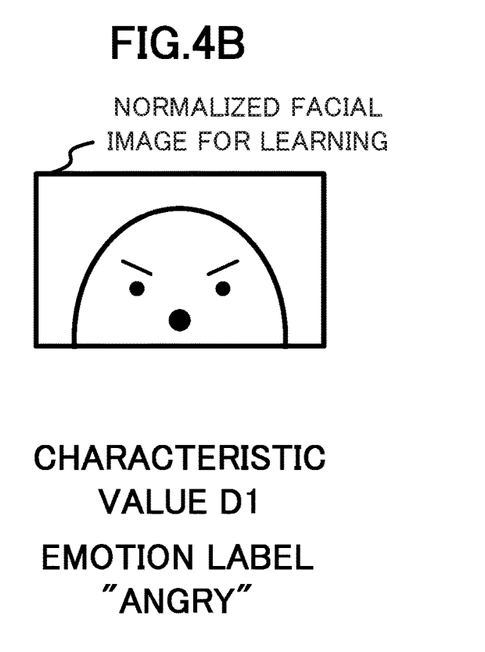
FIG. 4B is a drawing for explaining an emotion recognition model generation process for generating a second emotion recognition model.

Specifically, when generating the second emotion recognition model 26, the emotion recognition model generation apparatus normalizes each of the facial images for learning so as not to include the mouth area, as shown in FIG. 4B, by normalizing in step S102 each of the facial images for learning on the basis of the positions of the eye area and the positions of the nose area detected in step S101. The emotion recognition model generation apparatus stores in memory image normalization parameters used at this time.

The emotion recognition model generation apparatus generates the second emotion recognition model 26 having the structure shown in FIG. 5 by executing the processes of steps S103~S108 using the facial images for learning normalized so as not to include the mouth area in step S102. That is to say, the emotion recognition model generation apparatus generates the second emotion recognition model 26 using the plurality of facial images, omitting the mouth area that is the image area showing the mouth of the target individual in each of the facial images.

In this exemplary embodiment, a case was described in which the first emotion recognition model 25 and the second emotion recognition model 26 are generated separately, but this is but one example. The first emotion recognition model 25 and the second emotion recognition model 26 may be generated together by a single process, using common facial images for learning.

[Exemplary Embodiment of the Emotion Estimation Process]

Below, the actions of the emotion estimation apparatus 1 having the above-described physical and functional configuration in estimating the emotions of the target individual using the target individual facial images 23 are described, with reference to FIG. 6. The emotion estimation apparatus 1 estimates the emotions of the target individual using the target individual facial images 23, by executing an emotion estimation process shown in the flowchart of FIG. 6.

The emotion estimation apparatus 1 acquires in advance the target individual facial images 23, the surrounding voice data 24, the first emotion recognition model 25 and the second emotion recognition model 26, via the external interface 50, and stores this information in the memory 20. In the memory 20, the target individual facial images 23 and the surrounding voice data 24 are stored associated with each other.

Figure 6:
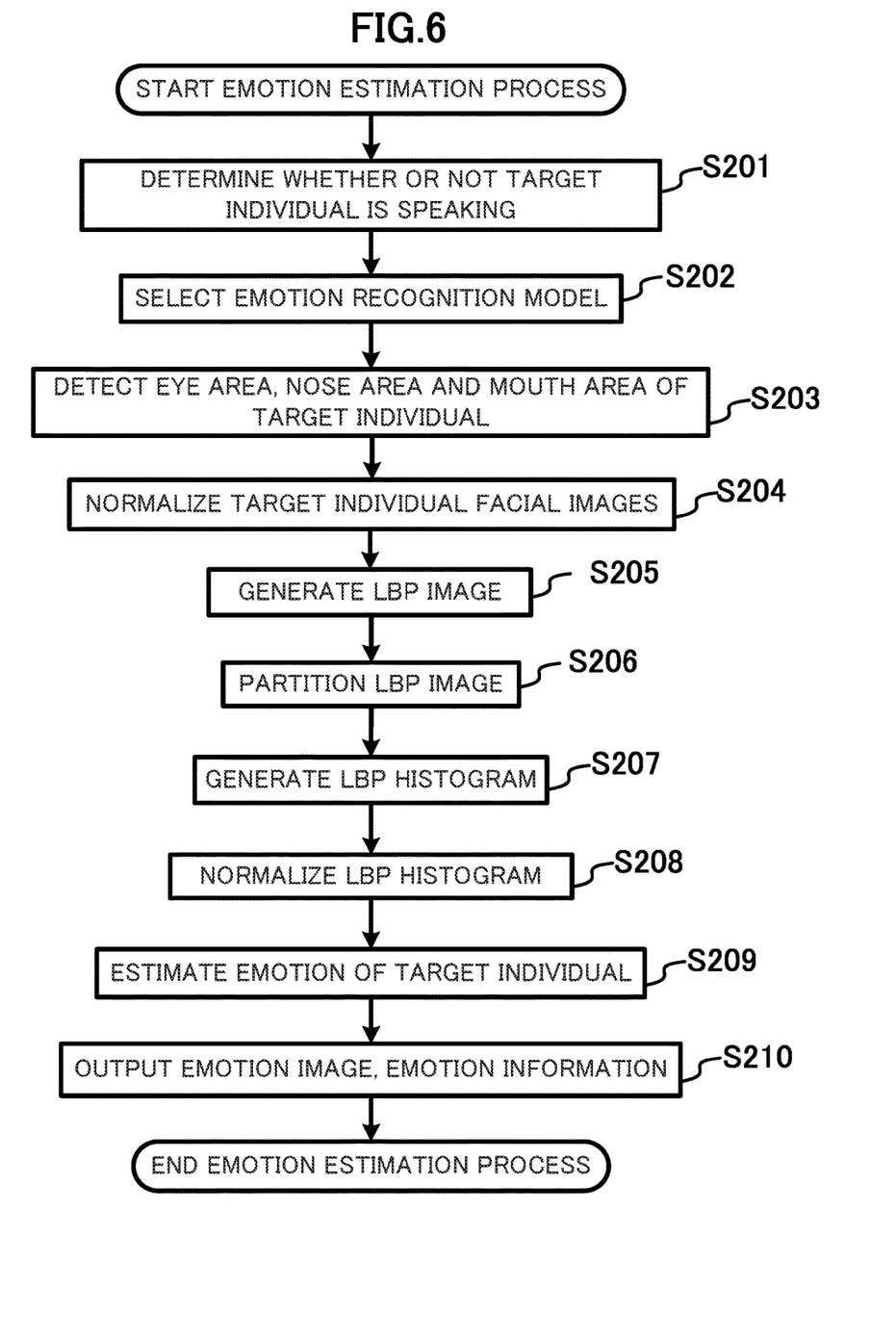
FIG. 6 is a flowchart for explaining an emotion estimation process executed by the emotion estimation apparatus according to the exemplary embodiment of the present disclosure.

In this state, when a user desiring to estimate the emotions of the target individual commands estimation of emotions via the input device 30, the CPU 10 starts the emotion estimation process shown in the flowchart of FIG. 6, in response to this command.

First, the speech determiner 100 determines whether or not the target individual is speaking when the target individual facial images 23 are captured (step S201). Specifically, the speech determiner 100 determines that the target individual is not speaking if the sound volume of the surrounding voice data 24 is less than a first threshold value, and determines that the target individual is speaking if the sound volume of the surrounding voice data 24 is at least as great as the first threshold value.

The model selector 110a selects either the first emotion recognition model 25 or the second emotion recognition model 26 on the basis of the determination results in step S201 (step S202). Specifically, the model selector 110a selects the first emotion recognition model 25 when the speech determiner 100 determined in step S201 is that the target individual is not speaking, and selects the second emotion recognition model 26 when the speech determiner 100 determined in step S201 is that the target individual is speaking.

The emotion estimator 110 detects an eye area that is an image area showing the eyes in the target individual facial images 23, a nose area that is an image area showing the nose of the target individual, and a mouth area that is an image area showing the mouth of the target individual (step S203). The target individual facial images 23 are normalized using the image normalization parameters included in the emotion recognition model selected in step S202, on the basis of the positions of the detected eye area, nose area and mouth area (step S204).

Specifically, the emotion estimator 110 normalizes the target individual facial images 23 so as to include the image area showing the mouth of the target individual, by normalizing the target individual facial images 23 using the image normalization parameters included in the first emotion recognition model 25, in step S204, when the model selector 110a has selected the first emotion recognition model 25 in step S202. In addition, the emotion estimator 110 normalizes the target individual facial images 23 so as not to include the image area showing the mouth of the target individual, by normalizing the target individual facial images 23 using the image normalization parameters included in the second emotion recognition model 26, in step S204, when the model selector 110a has selected the second emotion recognition model 26 in step S202.

The emotion estimator 110 generates an LBP image by calculating the LBP of all pixels included in the target individual facial images 23 normalized in step S204 (step S205).

The emotion estimator 110 partitions the LBP image generated in step S205 into a plurality of blocks using the partition parameters included in the emotion recognition model selected in step S202 (step S206). Specifically, the emotion estimator 110 partitions the LBP image using the partition parameters included in the first emotion recognition model 25 when the first emotion recognition model 25 is selected by the model selector 110a in step S202. In addition, the emotion estimator 110 partitions the LBP image using the partition parameters included in the second emotion recognition model 26 when the second emotion recognition model 26 is selected by the model selector 110a in step S202.

The emotion estimator 110 generates an LBP histogram for the target individual facial images 23 normalized in step S204, by linking the LBP histograms of all blocks after the LBP histogram is generated for each block partitioned in step S206 (step S207).

The emotion estimator 110 normalizes the LBP histogram generated in step S207 with dimensional units, using the histogram normalization parameters included in the emotion recognition model selected in step S202 (step S208). Specifically, the emotion estimator 110 normalizes the LBP histogram using the histogram normalization parameters included in the first emotion recognition model 25, when the first emotion recognition model 25 was selected by the model selector 110a in step S202. In addition, the emotion estimator 110 normalizes the LBP histogram using the histogram normalization parameters included in the second emotion recognition model 26, when the second emotion recognition model 26 was selected by the model selector 110a in step S202.

The emotion estimator 110 estimates the emotion of the target individual using the LBP histogram normalized in step S208, and the support vector machine defined by the SVM parameters included in the emotion recognition model selected in step S202 (step S209). Specifically, when the model selector 110a selected the first emotion recognition model 25 in step S202, the emotion estimator 110 estimates the emotion of the target individual using the support vector machine defined by the SVM parameters included in the first emotion recognition model 25. In addition, when the model selector 110a selected the second emotion recognition model 26 in step S202, the emotion estimator 110 estimates the emotion of the target individual using the support vector machine defined by the SVM parameters included in the second emotion recognition model 26.

That is to say, the emotion estimator 110 partitions the target individual facial images 23 into areas of eyes, nose, mouth and/or the like, in the same way as when the emotion recognition model generation apparatus generated the emotion recognition model. Then, the areas are subdivided further into outside corner of the eye and inside corner of the eye. Furthermore, an LBP histogram is generated in the same way as with the emotion recognition model generation apparatus for each subdivided area, and dimensional normalization is accomplished. Then, the normalized LBP histogram is taken as characteristic data of the target individual facial images 23, and whether the characteristic data belongs to the facial images in any of the emotional states of the human emotions is identified, using the SVM in the emotion recognition model.

The emotion estimator 110 displays a text message showing the emotion of the target individual estimated in step S209 on the display of the output device 40 as an emotion image, and emotion information showing the emotion of the target individual estimated in step S209 is sent to an external information processing apparatus (not shown) via the external interface 50 (step S210), and the emotion estimation process concludes.

As described above, the emotion estimation apparatus 1 executes mutually differing emotion estimation processes using the target individual facial images 23 in accordance with whether the speech determiner 100 determined that the target individual was speaking at the time the target individual facial images 23 were captured. Consequently, the emotion estimation apparatus 1 can estimate the emotions of the target individual with high accuracy, using the target individual facial images 23.

The exemplary embodiment of the present disclosure was described above, but this exemplary embodiment is but one example, and the scope of the present disclosure is not limited by this exemplary embodiment. Various variations of the present disclosure are possible, and all exemplary embodiments are included within the scope of the present disclosure.

In the above-described exemplary embodiment, the emotion estimation apparatus 1 acquires in advance the target individual facial images 23 captured by the external imaging apparatus (not shown), and the surrounding voice data 24 of the target individual when the facial images 23 were captured, acquired by the external recording apparatus (not shown), and stores the target individual facial images 23 and the surrounding voice data 24 associated with each other in the memory 20. However, this is but one example. The emotion estimation apparatus 1 can acquire the target individual facial images 23 and the surrounding voice data 24 through an arbitrary method.

For example, the emotion estimation apparatus 1 may include an imager (not shown) and may acquire the target individual facial images 23 by capturing the face of the target individual using the imager. In addition, the emotion estimation apparatus 1 may include a voice input device (not shown) and using this voice input device may acquire, as the surrounding voice data 24, voice data expressing voices surrounding the target individual when the target individual facial images 23 are captured by the imager. In this case, the emotion estimation apparatus 1 may continuously accomplish acquisition of the target individual facial images 23 and the surrounding voices of the target individual, and also emotion recognition of the target individual using the target individual facial images 23 based on the absence or presence of speaking by the target individual.

In the above-described exemplary embodiment, the first emotion recognition model 25 and the second emotion recognition model 26 are generated through an emotion recognition model generation process shown in the flowchart in FIG. 3, and have the configuration shown in FIG. 5. However, this is but one example. The first emotion recognition model 25 may be an emotion recognition model having an arbitrary structure and be generated through an arbitrary method, as long as this is a recognition model that estimates the emotion of the target individual using images to include the mouth area of the target individual, out of the target individual facial images. The second emotion recognition model 26 may be an emotion recognition model having an arbitrary structure and be generated through an arbitrary method, as long as this is a recognition model that estimates the emotion of the target individual using images not to include the mouth area of the target individual, out of the target individual facial images.

In the above-described exemplary embodiment, the speech determiner 100 determines that the target individual is not speaking if the sound volume of the surrounding voice data 24 is less than the first threshold value, and determines that target individual is speaking if the sound volume of the surrounding voice data 24 is at least as great as the first threshold value. However, this is but one example. The speech determiner 100 can determine whether or not the target individual is speaking when the target individual facial images 23 are captured through an arbitrary method.

For example, the speech determiner 100 may determine whether or not the target individual is speaking on the basis of the degree of similarity between the surrounding voice data 24 and vowel voice data and consonant voice data. Vowel voice data is voice data expressing vowels, and consonant voice data is voice data expressing consonants. Specifically, the speech determiner 100 may determine that the target individual is not speaking when at least one out of the degree of similarity between the surrounding voice data 24 and the vowel voice data and the degree of similarity between the surrounding voice data 24 and the consonant voice data is less than a second threshold value. In addition, the speech determiner 100 may determine that the target individual is speaking when at least one out of the degree of similarity between the surrounding voice data 24 and the vowel voice data and the degree of similarity between the surrounding voice data 24 and the consonant voice data is at least as great as the second threshold value. The second threshold value is preset by an arbitrary method such as experimentation and/or the like.

Or, the speech determiner 100 may acquire from an external source speech information indicating whether or not the target individual is speaking when the target individual facial images 23 are captured, and may determine whether or not the target individual is speaking on the basis of this speech information. The speech determiner 100 can acquire the speech information through an arbitrary method. For example, the speech determiner 100 may acquire, as the speech information, information indicating whether or not the target individual is speaking when the target individual facial images 23 are captured, input by the user using the input device 30.

[Variation to Emotion Estimation Process]

In the above-described exemplary embodiment, the emotion estimator 110 executes mutually differing emotion estimation processes using the target individual facial images 23 when the speech determiner 100 determines that the target individual is not speaking and when the speech determiner 100 determines that the target individual is speaking. Specifically, the emotion estimator 110 executes the emotion estimation process by selecting the first emotion recognition model 25 when the speech determiner 100 determines that the target individual is not speaking, and executes the emotion estimation process by selecting the second emotion recognition model 26 when the speech determiner 100 determines that the target individual is speaking.

In a variation of the emotion estimation process, the emotion estimator 110 operates such that the emotion estimation process is executed using the target individual facial images 23 when the speech determiner 100 determined that the target individual was not speaking, and such that the emotion estimation process using the target individual facial images 23 is not accomplished when the speech determiner 100 determined that the target individual is speaking.

Figure 7:
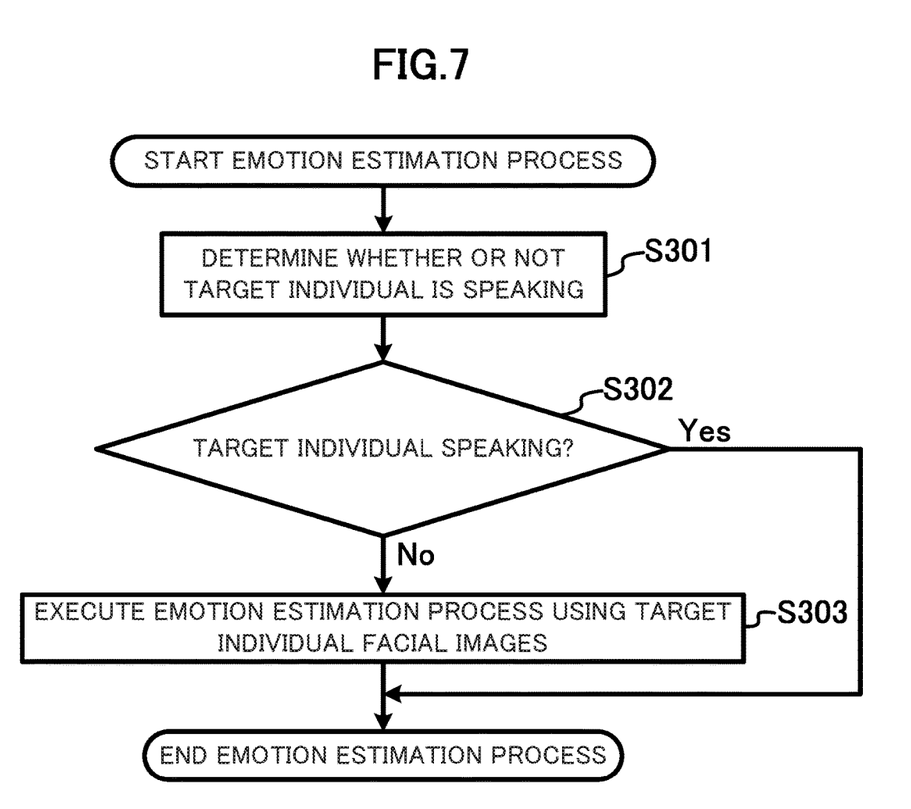
FIG. 7 is a flowchart for explaining an emotion estimation process executed by an emotion estimation apparatus according to a variation on the present disclosure.

Below, the variation on the emotion recognition process is described with reference to FIG. 7.

First, the speech determiner 100 determines whether or not the target individual is speaking when the target individual facial images 23 are captured (step S301). This process is the same process as in step S201 of the first exemplary embodiment.

When the determination is that the target individual is not speaking in the determination results in step S301 (step S302: No), the emotion estimator 110 executes the emotion estimation process using the target individual facial images 23 (step S303). Specifically, the processes of step S203 through step S210 in the first exemplary embodiment are accomplished using the first emotion recognition model 25, following which the emotion estimation process concludes.

In addition, when the determination is that the target individual is speaking in the determination results in step S301 (step S302: Yes), the emotion estimator 110 concludes the emotion estimation process without executing the emotion estimation process using the target individual facial images 23 (prohibiting execution of the emotion estimation process using the target individual facial images 23). In this exemplary embodiment, the description was that the emotion estimation process concludes without executing the emotion estimation process using the target individual facial images 23 when a determination is made that the target individual is speaking, but this is but one example. When a determination is made that the target individual is speaking, the emotion of the target individual can be estimated by executing an arbitrary emotion estimation process not using the target individual facial images 23, without executing the emotion estimation process using the target individual facial images 23 (prohibiting execution of the emotion estimation process using the target individual facial images 23). For example, when a determination was made that the target individual is speaking, the emotion of the target individual may be estimated using the voice of the target individual expressed by the surrounding voice data 24, without executing the emotion estimation process using the target individual facial images 23. Technology for estimating the emotion of the target individual using the target individual's voice is commonly known in this field, so detailed description is omitted here.

The emotion estimator 110 may execute the emotion estimation process using the target individual facial images 23 when a determination is made that the target individual is speaking. Specifically, the processes of step S203 through step S210 in the first exemplary embodiment are executed using the second emotion recognition model 26, and when the target individual is not speaking, the emotion estimation process may conclude without executing the emotion estimation process using the target individual facial images 23.

As described above, the emotion estimation apparatus 1 can estimate the emotion of the target individual with high accuracy, because emotion estimation is accomplished without being influenced by whether or not the target individual is speaking, when the emotion of the target individual using the target individual facial images 23 is estimated.

In the above-described exemplary embodiment, and in the variation, the emotion estimation apparatus 1 outputs the results of the emotion estimation process by displaying an emotion image on the display comprising the output device 40, and sending emotion information via the external interface 50. However, this is but one example. The emotion estimation apparatus 1 can output results of the emotion estimation process through an arbitrary method. For example, the output device 40 of the emotion estimation apparatus 1 may include a speaker (not shown) and may output from the speaker an emotion voice that is a voice expressing the emotion of the target individual estimated by the emotion estimation apparatus 1.

The emotion estimation apparatus according to the present disclosure can be realized by an arbitrary electronic device such as a computer, mobile phone, smartphone, camera personal digital assistant (PDA) and/or the like. Specifically, a program for causing these electronic devices to operate as the emotion estimation apparatus according to the present disclosure can be stored on and distributed via a recording medium readable by these electronic devices (for example, a memory card, a compact disc read-only memory (CD-ROM), a digital versatile disc read-only memory (DVD-ROM) and/or the like), and the emotion estimation apparatus according to the present disclosure can be realized by installing this program on the electronic device.

Or, the above-described program may be stored on a storage device (for example, a disk device and/or the like) possessed by a server device on a communication network such as the Internet and/or the like, and the emotion estimation apparatus according to the present disclosure may be realized by an electronic device such as a computer, mobile phone, smartphone, camera, PDA and/or the like downloading the program.

In addition, when the functions of the emotion estimation apparatus according to the present disclosure are realized through cooperation or division between an operating system (OS) and application programs, the application programs alone may be stored on the recording medium or storage device.

In addition, the application programs may be overlaid on carrier waves and distributed via a communication network. For example, the application programs may be posted on a bulletin board system (BBS) on a communication network and the application programs may be distributed via the network. Furthermore, the emotion estimation apparatus according to the present disclosure may be realized by installing and running the application programs on a computer and simultaneously executing other application programs, under control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An emotion estimation apparatus comprising:
   a processor; and
   a memory that stores a first emotion recognition model and a second emotion recognition model, the first emotion recognition model and the second emotion recognition model estimating emotions;
   wherein the processor is configured to execute:
   a speech determination process of determining whether or not a target individual is speaking when facial images of the target individual are captured;
   an emotion recognition selection process of selecting the first emotion recognition model stored in the memory when the speech determination process has determined that the target individual is not speaking, and selecting the second emotion recognition model stored in the memory when the speech determination process has determined that the target individual is speaking;
   a facial characteristic value extraction process of extracting a first facial characteristic value including a mouth area of the target individual from a captured facial images of the target individual when the speech determination process has determined that the target individual is not speaking, and extracting a second facial characteristic value not including the mouth area of the target individual from the captured facial images of the target individual when the speech determination process has determined that the target individual is speaking;
   an emotion recognition process of estimating an emotion of the target individual using the first facial characteristic value extracted by the facial characteristic value extraction process and the first emotion recognition model selected by the emotion recognition selection process when the speech determination process has determined that the target individual is not speaking, and estimating an emotion of the target individual using the second facial characteristic value extracted by the facial characteristic value extraction process and the second emotion recognition model selected by the emotion recognition selection process when the speech determination process has determined that the target individual is speaking; and
   an emotion information output process of outputting emotion information showing the emotion of the target individual estimated by the emotion recognition process.

2. The emotion estimation apparatus according to claim 1, wherein the speech determination process determines whether or not the target individual is speaking based on voices when the facial images of the target individual are captured.

3. The emotion estimation apparatus according to claim 2, wherein the speech determination process:
   determines that the target individual is not speaking if sound volume of surrounding voice data expressing voices surrounding the target individual when the facial images of the target individual are captured is less than a first threshold value; and
   determines that the target individual is speaking if sound volume of the surrounding voice data is at least as great as the first threshold value.

4. The emotion estimation apparatus according to claim 2, wherein the speech determination process:
   determines that the target individual is not speaking if at least one out of a degree of similarity between surrounding voice data expressing voices surrounding the target individual when the facial images of the target individual are captured and vowel voice data expressing vowels, and a degree of similarity between the surrounding voice data and consonant voice data expressing consonants, is less than a second threshold value; and
   determines that the target individual is speaking if at least one out of the degree of similarity between the surrounding voice data and the vowel voice data, and the degree of similarity between the surrounding voice data and the consonant voice data, is at least as great as the second threshold value.

5. An emotion estimation method executed by an emotion estimation apparatus comprising a memory that stores a first emotion recognition model and a second emotion recognition model, the first emotion recognition model and the second emotion recognition model estimating emotions, the emotion estimation method including:
- a speech determination step of determining whether or not a target individual is speaking when facial images of the target individual are captured;
- an emotion recognition selection step of selecting the first emotion recognition model stored in the memory when the speech determination step has determined that the target individual is not speaking, and selecting the second emotion recognition model stored in the memory when the speech determination step has determined that the target individual is speaking;
- a facial characteristic value extraction step of extracting a first facial characteristic value including a mouth area of the target individual from a captured facial images of the target individual when the speech determination step has determined that the target individual is not speaking, and extracting a second facial characteristic value not including the mouth area of the target individual from the captured facial images of the target individual when the speech determination step has determined that the target individual is speaking;
- an emotion recognition step of estimating an emotion of the target individual using the first facial characteristic value extracted by the facial characteristic value extraction step and the first emotion recognition model selected by the emotion recognition selection step when the speech determination step has determined that the target individual is not speaking, and estimating an emotion of the target individual using the second facial characteristic value extracted by the facial characteristic value extraction step and the second emotion recognition model selected by the emotion recognition selection step when the speech determination step has determined that the target individual is speaking; and
- an emotion information output step of outputting emotion information showing the emotion of the target individual estimated by the emotion recognition step.

6. The emotion estimation method according to claim 5, wherein the speech determination step comprises determining whether or not the target individual is speaking based on voices when the facial images of the target individual are captured.

7. The emotion estimation method according to claim 6, wherein the speech determination step comprises:
- determining that the target individual is not speaking if sound volume of surrounding voice data expressing voices surrounding the target individual when the facial images of the target individual are captured is less than a first threshold value; and
- determining that the target individual is speaking if sound volume of the surrounding voice data is at least as great as the first threshold value.

8. The emotion estimation method according to claim 6, wherein the speech determination step comprises:
- determining that the target individual is not speaking if at least one out of a degree of similarity between surrounding voice data expressing voices surrounding the target individual when the facial images of the target individual are captured and vowel voice data expressing vowels, and a degree of similarity between the surrounding voice data and consonant voice data expressing consonants, is less than a second threshold value; and
- determining that the target individual is speaking if at least one out of the degree of similarity between the surrounding voice data and the vowel voice data, and the degree of similarity between the surrounding voice data and the consonant voice data, is at least as great as the second threshold value.

9. A non-transitory computer readable medium on which is recorded a program for causing a computer including an emotion estimation apparatus comprising a memory that stores a first emotion recognition model and a second emotion recognition model, the first emotion recognition model and the second emotion recognition model estimating emotions to execute:
- a speech determination process of determining whether or not a target individual is speaking when facial images of the target individual are captured;
- an emotion recognition selection process of selecting the first emotion recognition model stored in the memory when the speech determination process has determined that the target individual is not speaking, and selecting the second emotion recognition model stored in the memory when the speech determination process has determined that the target individual is speaking;
- a facial characteristic value extraction process of extracting a first facial characteristic value including a mouth area of the target individual from a captured facial images of the target individual when the speech determination process has determined that the target individual is not speaking, and extracting a second facial characteristic value not including the mouth area of the target individual from the captured facial images of the target individual when the speech determination process has determined that the target individual is speaking;
- an emotion recognition process of estimating an emotion of the target individual using the first facial characteristic value extracted by the facial characteristic value extraction process and the first emotion recognition model selected by the emotion recognition selection process when the speech determination process has determined that the target individual is not speaking, and estimating an emotion of the target individual using the second facial characteristic value extracted by the facial characteristic value extraction process and the second emotion recognition model selected by the emotion recognition selection process when the speech determination process has determined that the target individual is speaking; and
- an emotion information output process of outputting emotion information showing the emotion of the target individual estimated by the emotion recognition process.

10. The non-transitory computer readable medium according to claim 9, wherein the speech determination process determines whether or not the target individual is speaking based on voices when the facial images of the target individual are captured.

11. The non-transitory computer readable medium according to claim 9, wherein the speech determination process:
- determines that the target individual is not speaking if sound volume of surrounding voice data expressing voices surrounding the target individual when the facial images of the target individual are captured is less than a first threshold value; and determines that the target individual is speaking if sound volume of the surrounding voice data is at least as great as the first threshold value.

12. The non-transitory computer readable medium according to claim 9, wherein the speech determination process:

determines that the target individual is not speaking if at least one out of a degree of similarity between surrounding voice data expressing voices surrounding the target individual when the facial images of the target individual are captured and vowel voice data expressing vowels, and a degree of similarity between the surrounding voice data and consonant voice data expressing consonants, is less than a second threshold value; and determines that the target individual is speaking if at least one out of the degree of similarity between the surrounding voice data and the vowel voice data, and the degree of similarity between the surrounding voice data and the consonant voice data, is at least as great as the second threshold value.

* * * * *